Feb. 20, 1945.   B. H. ROBERTS   2,369,856
LOCK
Filed March 14, 1942
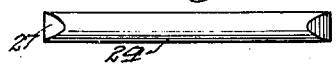
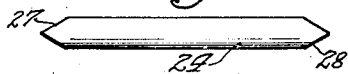
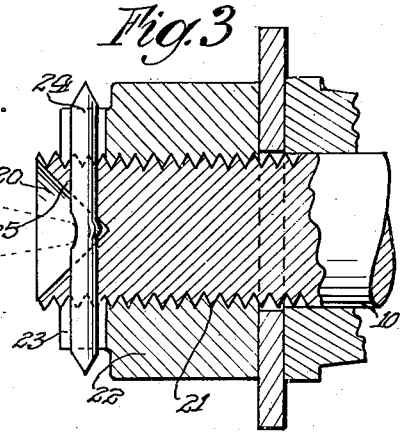
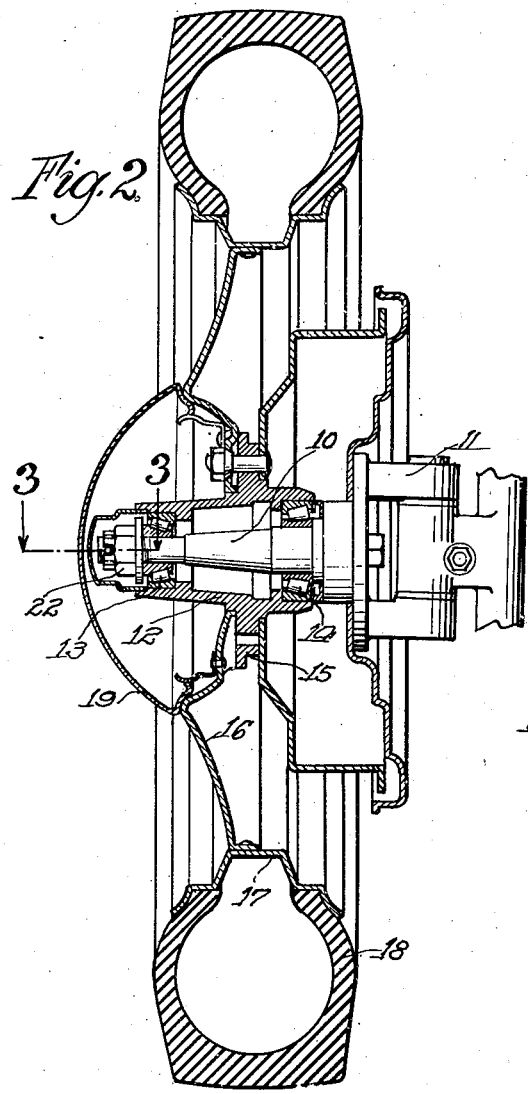
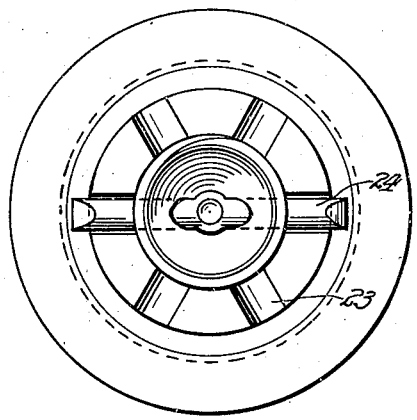
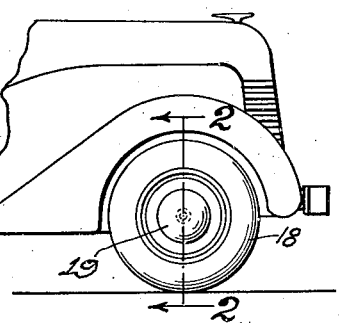
Inventor
Byron H. Roberts
by  Henry Hech
Attorney.

Patented Feb. 20, 1945

2,369,856

UNITED STATES PATENT OFFICE 2,369,856

LOCK

Byron H. Roberts, Chicago, Ill.

Application March 14, 1942, Serial No. 434,643

2 Claims. (Cl. 151—5)

The invention relates to locks and more particularly to locks for the wheels of motor vehicles. Locks for securing wheels to the hub have been provided so as to prevent unauthorized removal of tires. While this means is effective in the case of rear wheels, no provision is made for locking front wheels against removal in toto from the spindle or axle by simply extracting the cotter pin from the nut at the end of the spindle, removing the nut and then slipping off the wheel.

It therefore constitutes an object of my invention to provide effective means for preventing removal of front wheels from motor vehicles. A further object is the provision of a nut holding the front wheel to the spindle, said nut being permanently secured to the spindle to preclude removal of the wheel.

A still further object aims at providing a pin extending through the nut, which pin is locked to the spindle to prevent removal of the nut and of the wheel.

With these and other objects in view, which will become apparent from a perusal of the invention, the latter comprises the means described in the following specifications particularly pointed out in the claims forming a part thereof, and illustrated in the accompanying drawing, in which:

Figure 1 is a fragmentary side view of the front part of a vehicle to which my invention has been applied.

Figure 2 is an enlarged section on the line 2—2 of Figure 1.

Figure 3 is a section on the line 3—3 of Figure 2.

Figure 4 is a side view of a front wheel.

Figures 5 and 6 are, respectively, side view and top view of a pin.

Referring to the several views in the drawing, 10 designates a spindle which is connected in the usual manner to a steering knuckle 11. A hub 12 surrounds the spindle and rotates on ball bearings 13 and 14 provided therebetween. A circular flange 15 has connected thereto the wheel disk 16 which connects with a wheel rim 17 in which the tire 18 is mounted.

A hub cover 19 is applied to the disk to mask the end of the spindle.

The spindle 10 has a conical counterbore 20 at the free end and is provided with threads 21 to receive a nut 22 which is provided with slots 23.

A pin 24 is inserted in one of the slots 23 and extends through a bore 25 in the spindle. That portion of the pin which is in the counterbore 20 may be swaged with a punch 26 whereby the pin becomes deformed and precludes its being removed.

It is evident that the cotter pin normally employed for securing the nut against rotation and which pin may be easily removed has been replaced by the pin 24, which by swaging is deformed.

In order to further prevent removal of the pin 24 the ends thereof are flattened as at 27 and 28 to prevent the use of a punch or similar instrument to force the pin through the nut by blows.

If it ever becomes necessary to remove the wheel then the portion of the pin within the counterbore 20 is drilled out so that the top and bottom part of the pin may be removed by a punch operating on the free end of the pin.

I claim:

1. A safety lock for securing vehicle wheels against removal, comprising in combination with a shaft having a counterbore at one end and carrying a wheel, a castellated nut on said shaft having its slots in registry with a transverse hole in said shaft communicating with said counterbore substantially at its bottom and a pin extending through one of said slots and said hole, said pin being deformed within said counterbore against the inner wall thereof to be inaccessible to being straightened and secure against removal.

2. A safety lock for securing vehicle wheels against removal comprising in combination with a shaft having a conical counterbore at one end and carrying a wheel, a castellated nut on said shaft having its slots in registry with a transverse hole in said shaft opening into said counterbore substantially at its bottom, and pin extending through one of said slots and said hole, said pin having its portion within the counterbore swaged against the inner end thereof to be inaccessible to being straightened and secure against removal.

BYRON H. ROBERTS.